United States Patent
Walk et al.

(10) Patent No.: US 11,591,933 B2
(45) Date of Patent: Feb. 28, 2023

(54) METHOD FOR INSTALLING A GAS TURBINE ASSEMBLY ON A FOUNDATION, AND GAS TURBINE ASSEMBLY

(71) Applicant: Siemens Energy Global GmbH & Co. KG, Bayern (DE)

(72) Inventors: Oliver Tobias Walk, Essen (DE); Frank Weidner, Mülheim an der Ruhr (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/284,048

(22) PCT Filed: Sep. 16, 2019

(86) PCT No.: PCT/EP2019/074668
§ 371 (c)(1),
(2) Date: Apr. 9, 2021

(87) PCT Pub. No.: WO2020/078632
PCT Pub. Date: Apr. 23, 2020

(65) Prior Publication Data
US 2021/0381398 A1 Dec. 9, 2021

(30) Foreign Application Priority Data
Oct. 18, 2018 (DE) ...................... 10 2018 217 824.0

(51) Int. Cl.
*F01D 25/28* (2006.01)
*F01D 9/06* (2006.01)
*F01D 25/24* (2006.01)

(52) U.S. Cl.
CPC ............... *F01D 25/28* (2013.01); *F01D 9/06* (2013.01); *F01D 25/243* (2013.01);
(Continued)

(58) Field of Classification Search
CPC .... F01D 25/28; F01D 25/285; F05D 2240/91; F05D 2260/231; F05D 2260/30;
(Continued)

(56) References Cited

U.S. PATENT DOCUMENTS

2010/0162726 A1* 7/2010 Robertson ................ F16M 1/02
60/797
2010/0286889 A1 11/2010 Childers
(Continued)

FOREIGN PATENT DOCUMENTS

| CH | 701018 A2 | 11/2010 |
| EP | 2634381 A1 | 9/2013 |
| GB | 2512969 A | 10/2014 |

OTHER PUBLICATIONS

Rostock-Heute: Stadtwerke nehmen neue Gasturbinen in Betrieb, Jun. 10, 2017. URL: https ://www. rostockheute.de/stadtwerke-rostockkiaflwerk-fernwaerme-strommodernisierung/95880 [Retrieved an May 8, 2019]; English machine translation attached: Municipal Utilities put new gas turbines into operation.
(Continued)

*Primary Examiner* — Eldon T Brockman
*Assistant Examiner* — Maxime M Adjagbe
(74) *Attorney, Agent, or Firm* — Wolter Van Dyke Davis, PLLC

(57) ABSTRACT

A method for installing a gas turbine assembly of a first type at a position of an existing power plant where previously a gas turbine assembly of a second type was installed on a foundation specially designed for said second type. The gas turbine assembly includes at least one housing, a compressor, a combustion chamber, a gas turbine, and a plurality of venting and removal lines guided along the exterior of the housing. Modifications to the venting and/or removal lines of the gas turbine assembly of the first type are carried out
(Continued)

in a first step, and the modified gas turbine assembly is installed on the existing foundation in a second step.

12 Claims, 5 Drawing Sheets

(52) U.S. Cl.
CPC .... *F05D 2240/91* (2013.01); *F05D 2260/231* (2013.01); *F05D 2260/30* (2013.01)

(58) Field of Classification Search
CPC ............. F05D 2230/80; F05D 2230/72; F05D 2230/60; F02C 7/20
See application file for complete search history.

(56) References Cited

U.S. PATENT DOCUMENTS

| | | | |
|---|---|---|---|
| 2014/0123680 A1* | 5/2014 | Sancewich | F23R 3/283 29/889.22 |
| 2014/0373504 A1 | 12/2014 | Broker et al. | |
| 2016/0186659 A1 | 6/2016 | Nagao et al. | |
| 2017/0314469 A1* | 11/2017 | Roever | F01D 25/18 |

OTHER PUBLICATIONS

PCT International Search Report and Written Opinion of International Searching Authority dated Dec. 11, 2019 corresponding to PCT International Application No. PCT/EP2019/074668 filed Sep. 16, 2019.

* cited by examiner

METHOD FOR INSTALLING A GAS TURBINE ASSEMBLY ON A FOUNDATION, AND GAS TURBINE ASSEMBLY

CROSS REFERENCE TO RELATED APPLICATIONS

This application is the US National Stage of International Application No. PCT/EP2019/074668 filed 16 Sep. 2019, and claims the benefit thereof. The International Application claims the benefit of German Application No. DE 10 2018 217 824.0 filed 18 Oct. 2018. All of the applications are incorporated by reference herein in their entirety.

FIELD OF INVENTION

The invention relates to a method for installing a gas turbine assembly of a first design at a position of an existing power plant, at which position a gas turbine assembly of a second design was previously installed on a foundation which is designed specifically for said second design, the gas turbine assembly comprising at least one housing, a compressor, a combustion chamber, a gas turbine and a plurality of bleed air and removal lines which are routed on the outside along the housing. Furthermore, the invention relates to a gas turbine assembly with at least one housing which extends in a longitudinal direction, a compressor, a combustion chamber and a gas turbine which are arranged behind one another in the longitudinal direction, and a plurality of bleed air and removal lines which are routed on the outside along the housing, in each case have at least one line section which extends in the longitudinal direction and substantially parallel to the housing, and are connected on the end side via housing flanges to the housing.

BACKGROUND OF INVENTION

In the prior art, a gas turbine assembly which comprises at least one housing, a compressor, a combustion chamber, a gas turbine and a plurality of bleed air and removal lines which are routed on the outside along the housing is always set up on a foundation which is designed specifically for said gas turbine assembly. In other words, the gas turbine assembly and the foundation are adapted to one another in each case in such a way that, during the installation, a collision of components which lie on the outside of the gas turbine assembly with the foundation is prevented reliably. Accordingly, gas turbine assemblies of a first design of a first manufacturer do not fit on a foundation which has been designed for receiving a gas turbine assembly of a second design of a second manufacturer. If a gas turbine assembly of a power plant has to be replaced, power plant operators make a decision in most cases against this background to purchase the new gas turbine assembly again via that manufacturer which has already supplied the gas turbine assembly which is to be replaced, even if a tender of a competing manufacturer is better. Only if a new gas turbine assembly can no longer be obtained from the previous manufacturer because, for example, the latter no longer exists, the tender of other manufacturers is fallen back on. In this case, the old foundation is replaced by a new foundation which is then accordingly adapted again specifically to the gas turbine assembly which is to be newly installed. The replacement of a foundation is very time-consuming, however, with the result that the consequence thereof is long downtimes of the power plant, which accordingly entails high costs. Moreover, the replacement of a foundation can lead to a loss of the operating license, with the result that a new licensing procedure with uncertain downtimes has to be initiated.

SUMMARY OF INVENTION

Proceeding from this prior art, it is an object of the present invention to provide an alternative method of the type mentioned at the outset, which alternative method makes it possible for the power plant operator to replace a gas turbine assembly of a first design by one of a second design, without suffering significant disadvantages as a result.

In order to achieve this object, the present invention provides a method of the type mentioned at the outset which is characterized in that, in a first step, changes are made to the bleed air and/or removal lines of the gas turbine assembly of a first design, and in that, in a second step, the changed gas turbine assembly is installed on the existing foundation. Thanks to the changes which are made to the bleed air and/or removal lines, it is prevented effectively that the gas turbine assembly collides with a foundation which is fundamentally unsuitable for receiving the gas turbine assembly. In this way, a gas turbine assembly of a first design can be replaced by one of another design, without it being necessary for this purpose for the existing foundation to be changed or replaced. Accordingly, no additional downtimes of the power plant or licensing procedure are to be expected despite the change of the design.

The first step is advantageously carried out at least for the most part at a different location than the second step. Time and costs can be saved by virtue of the fact that the changes to the bleed air and/or removal lines are not made in situ at the location of the installation.

In accordance with one refinement of the method according to the invention, the changes which are carried out in the first step comprise a movement of position and/or a change in the line course of at least one bleed air and/or removal line, a reduction in the cross section and/or external diameter of at least one bleed air and/or removal line, a reduction in the thickness of at least one insulation means which surrounds a bleed air and/or removal line, a replacement of at least one compensator which is integrated into a bleed air and/or removal line, or combinations of these measures, the changes being carried out, in particular, in the region of the combustion chamber and/or the gas turbine.

According to the invention, furthermore, changes to the housing of the gas turbine assembly can be performed within the context of the first step, in particular in the form of a decrease in size of housing flanges and/or in the form of changes in the position of housing flanges, via which the bleed air and/or removal lines are attached to the housing. In this way, for example, spacings between the housing and the bleed air and/or removal lines can be decreased.

Furthermore, the present invention provides a gas turbine assembly with at least one housing which extends in a longitudinal direction, a compressor, a combustion chamber and a gas turbine which are arranged behind one another in the longitudinal direction, and a plurality of bleed air and removal lines which are routed on the outside along the housing, in each case have at least one line section which extends in the longitudinal direction and substantially parallel to the housing, and are connected on the end side via housing flanges to the housing, at least some of the bleed air and removal lines having a non-constant external diameter and/or an insulation means of non-constant thickness and/or a plurality of line sections which extend in the longitudinal direction and substantially parallel to the housing. In the present case, "substantially parallel" is to comprise angular deviations from the parallelism of the longitudinal axes of the two line sections of up to 15°.

At least some of the bleed air and removal lines advantageously have, in the region of the combustion chamber and/or the gas turbine, a line section with a smaller external diameter than in other line sections and/or a line section with a smaller insulation thickness than in other line sections and/or a line section which extends in the longitudinal direction and substantially parallel to the housing, the longitudinal axis of which line section is arranged closer to the housing than the longitudinal axis of another line section of the same line which extends in the longitudinal direction and substantially parallel to the housing.

BRIEF DESCRIPTION OF THE DRAWINGS

Further features and advantages of the present invention will become clear on the basis of the following description of a method in accordance with one embodiment of the present invention, with reference to the appended drawing, in which.

DETAILED DESCRIPTION OF INVENTION

Figure 1:
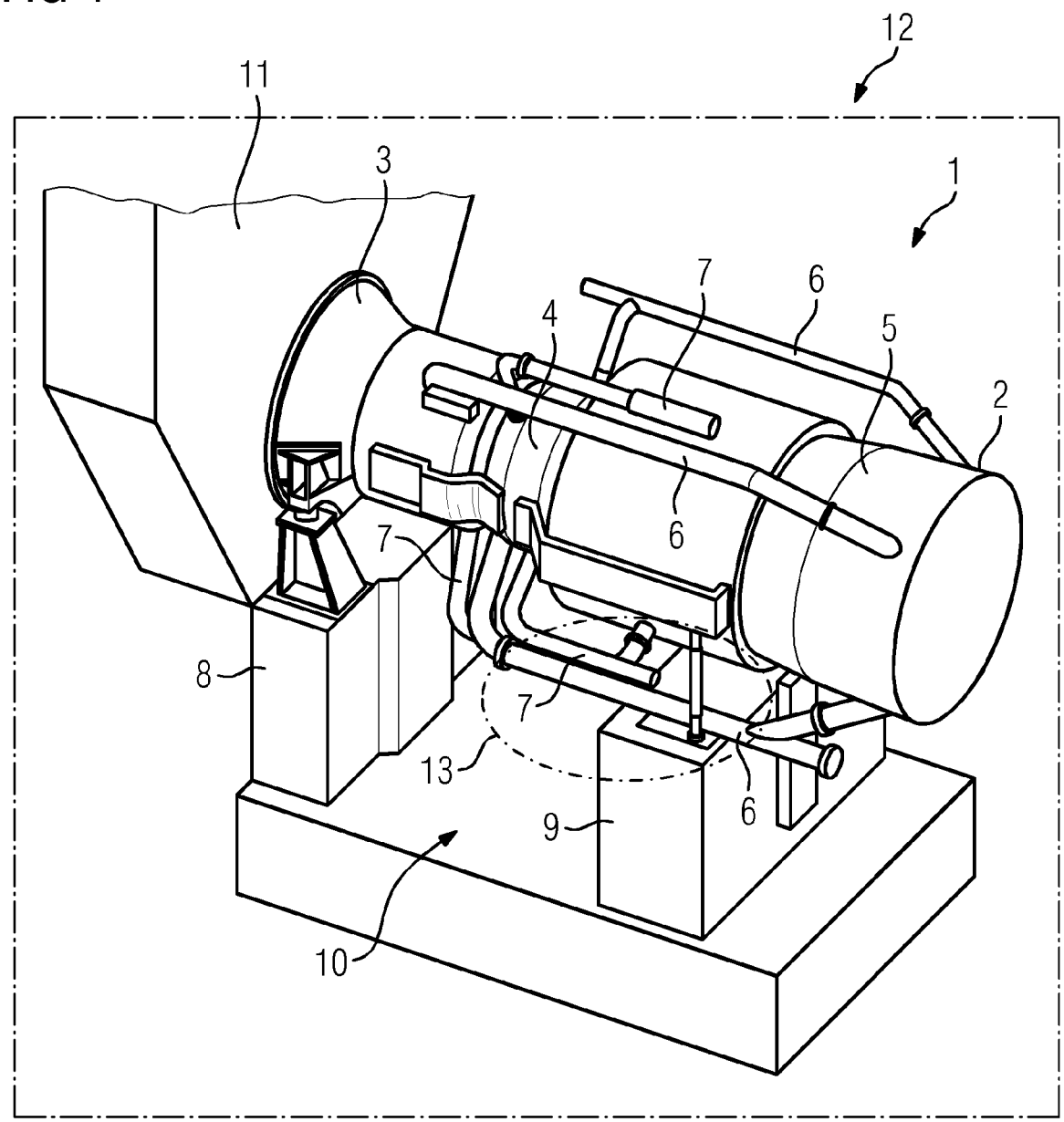
FIG. 1 shows a diagrammatic perspective view of a gas turbine assembly at a position of an existing power plant, at which position a gas turbine assembly of a second design was previously installed on a foundation which is designed specifically for said second design.
Figure 2:
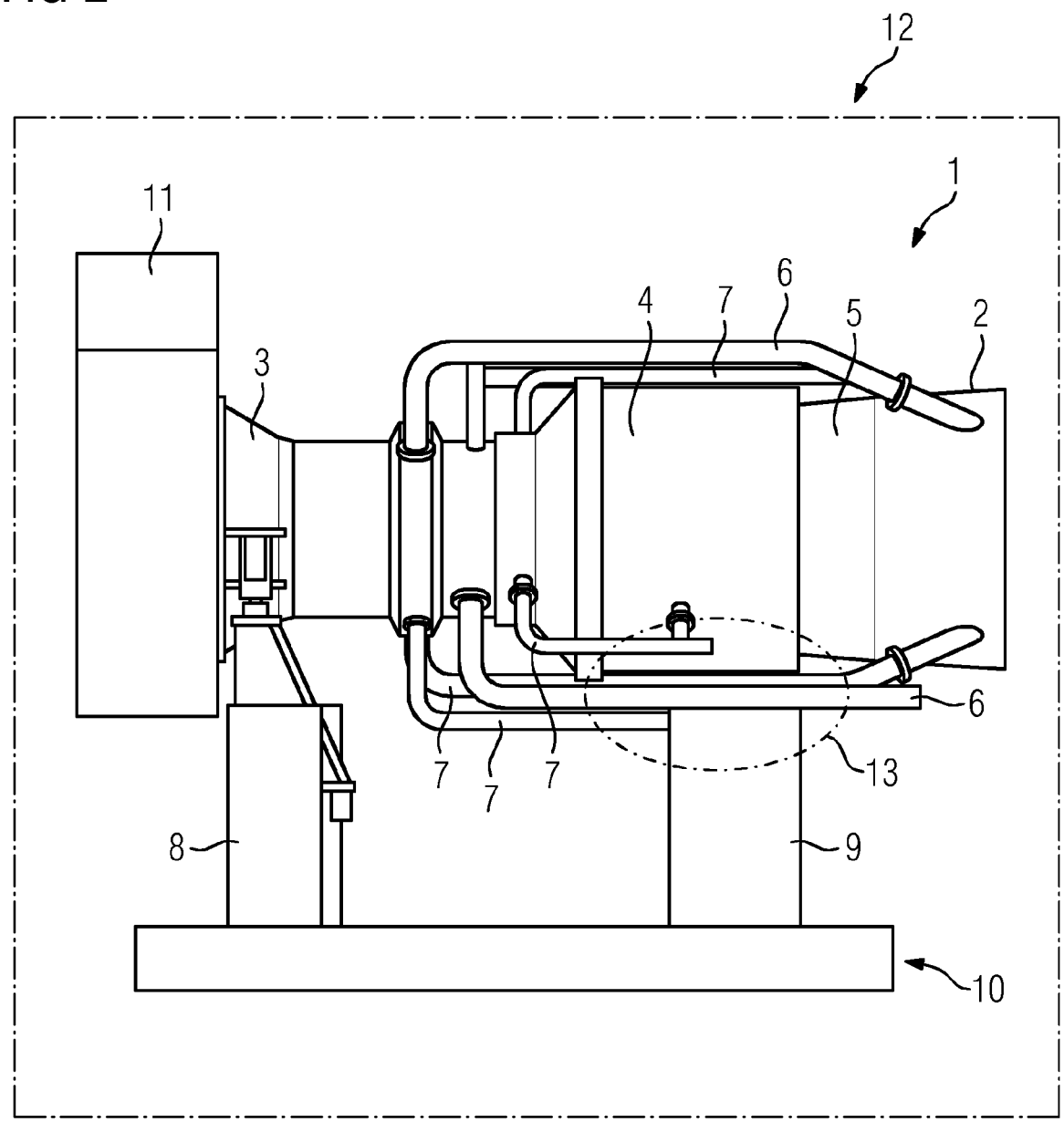
FIG. 2 shows a side view of the gas turbine assembly which is shown in FIG. 1.

FIGS. 1 and 2 show a gas turbine assembly 1, which is one of a first design of a first manufacturer, and which comprises a housing 2, which is assembled from a plurality of housing parts in the present case, a compressor 3, a combustion chamber 4, a gas turbine 5 and a plurality of bleed air lines 6 and removal lines 7 which are routed on the outside along the housing 2 and in each case have at least one line section which extends in the longitudinal direction and substantially parallel to the housing 2. Furthermore, FIGS. 1 and 2 show a foundation 10, which has two foundation blocks 8 and 9, and a docking means 11, which are constituent parts of an existing power plant 12. The foundation 10 is designed specifically for a gas turbine assembly (not shown in greater detail) of a second design of a second manufacturer, which gas turbine assembly was previously installed at that position, at which the gas turbine assembly 1 of the first design is now illustrated. The fact that the foundation 10 is not provided for receiving the gas turbine assembly 1 of the first design leads to a situation where bleed air lines 6 and removal lines 7 which are provided in the lower region of the housing 2 would collide in the region (labeled by way of the designation 13) below the combustion chamber 4 and the turbine 5 with the foundation block 9 (shown on the right in FIGS. 1 and 2) if the gas turbine assembly 1 were placed in the present form onto the foundation 10. Against this background, there are two procedures in the prior art for replacing an existing gas turbine assembly by a new gas turbine assembly. The first procedure consists in using a new gas turbine assembly of the same design, since this can be placed onto the existing foundation 10 without parts of the gas turbine assembly colliding with the latter. If a gas turbine assembly of another design is to be used as new gas turbine assembly, the old foundation 10 is removed according to the second procedure and is replaced by a new foundation which is designed specifically for receiving said gas turbine assembly of another design.

In the following text, a method in accordance with one embodiment of the present invention will be described with reference to FIGS. 3 and 4, by way of which method the gas turbine assembly 1 (shown in FIGS. 1 and 2) of a first design is installed on the existing foundation 10.

Figure 3:
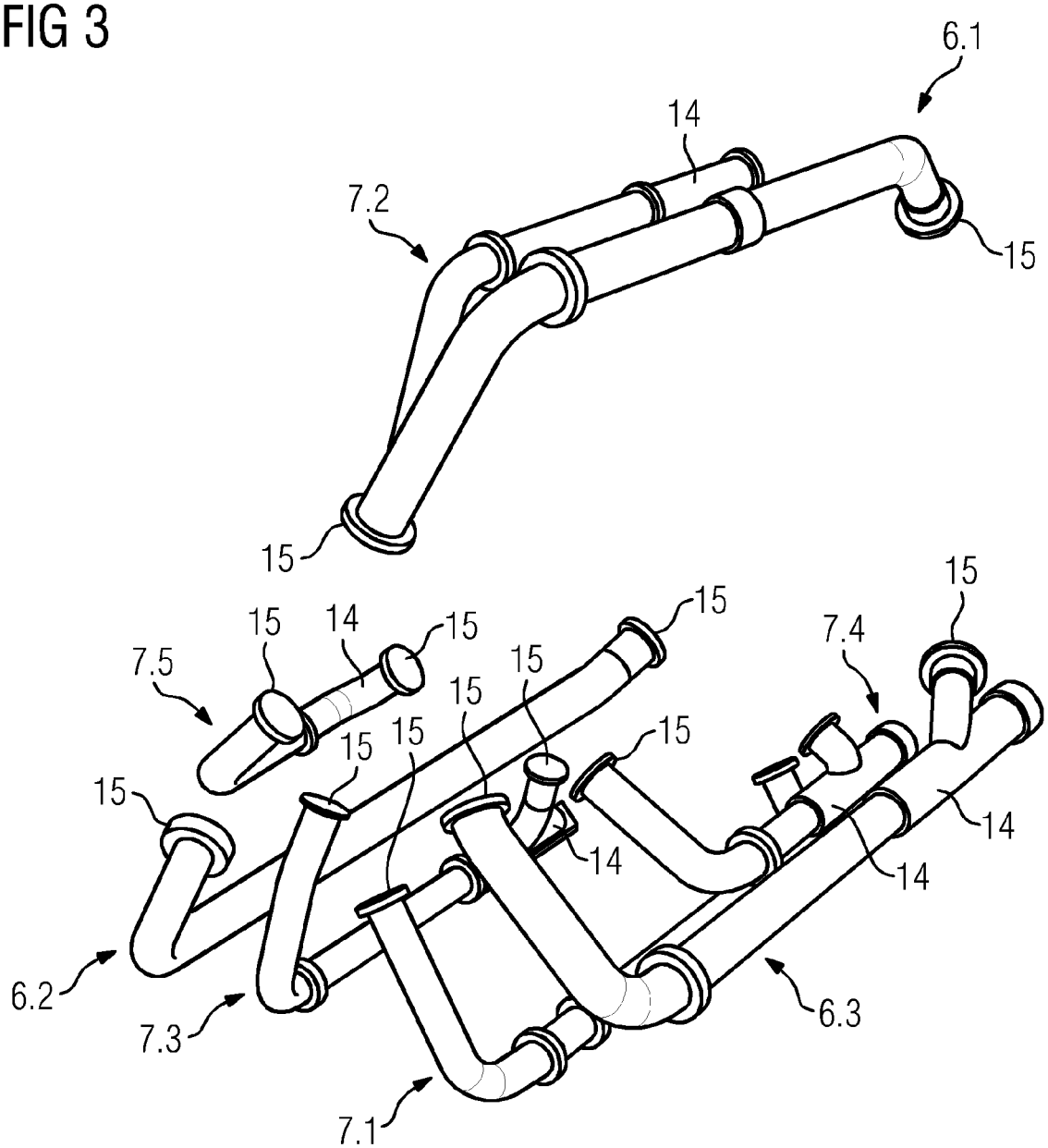
FIG. 3 shows a perspective view which shows bleed air and removal lines of the gas turbine assembly which is shown in FIGS. 1 and 2.
Figure 4:
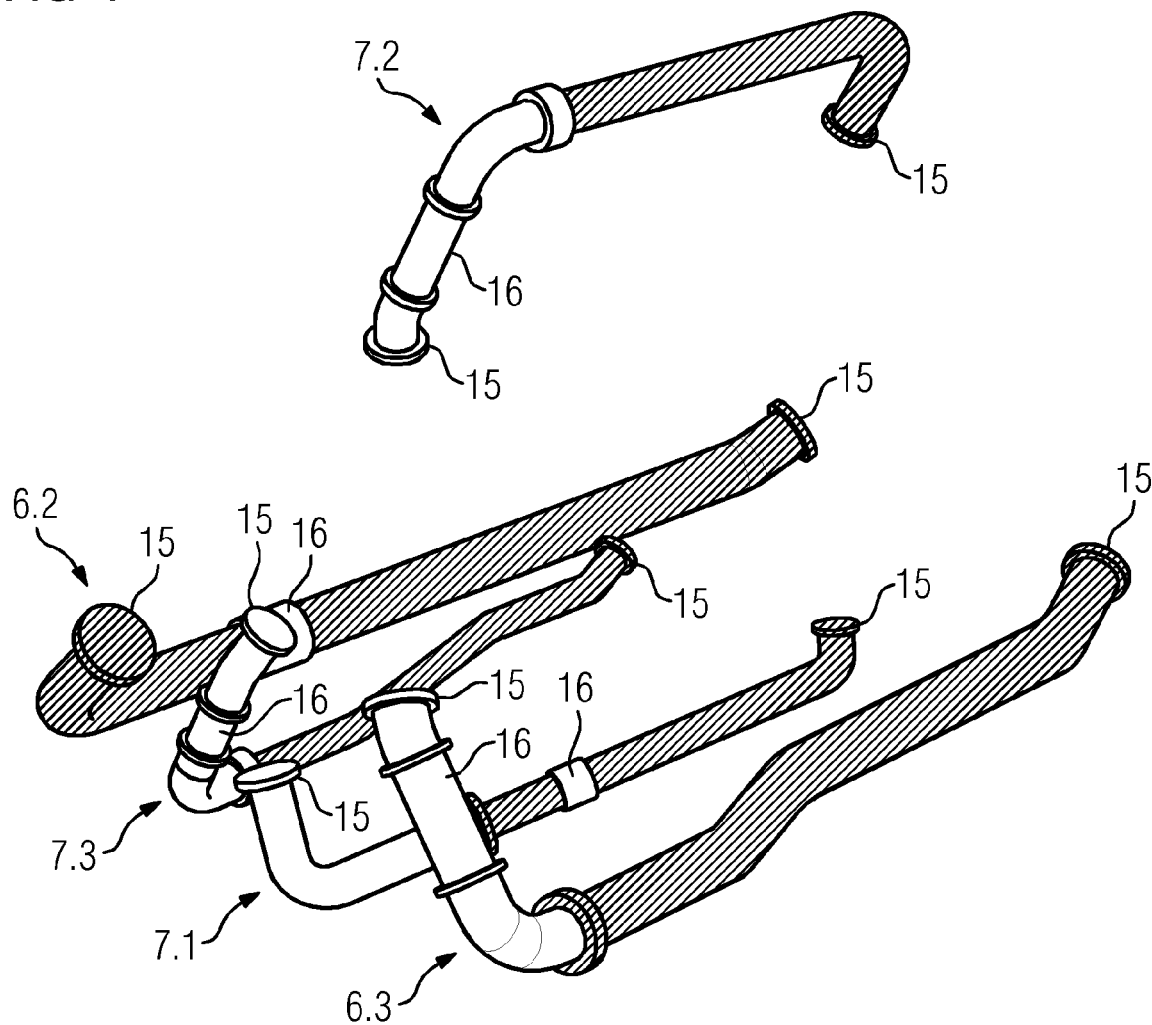
FIG. 4 shows a perspective view which shows the bleed air and removal lines which are shown in FIG. 3, in a state, in which they have been revised according to the invention.

FIG. 3 separately shows the bleed air lines 6 and removal lines 7 of the gas turbine assembly 1 (shown in FIGS. 1 and 2) of a first design, more precisely the bleed air lines 6.1, 6.2 and 6.3 and the removal lines 7.1, 7.2, 7.3, 7.4 and 7.5. All of the lines 6, 7 are provided with axial compensators 14 which serve to compensate for length changes of the lines 6, 7 which occur during the operation of the gas turbine assembly 1 and are primarily induced thermally.

In a first method step, changes are then made to at least some of the bleed air and removal lines 6, 7 which are shown in FIG. 3, in order to prevent a collision of said lines with the foundation 10. Said changes can fundamentally comprise movements of position, reductions in the cross section and/or external diameter, a reduction in the thickness of insulation means which surround lines, a replacement of compensators, or combinations of these measures, it being possible for all the measures to also be carried out only on regions of the lines. In the present case, the changes which are carried out in the first method step relate to the bleed air lines 6.2 and 6.3 and the removal lines 7.1, 7.2 and 7.3. FIG. 4 shows the changed state of said lines after the first method step has been carried out. The cross sections and external diameters of all of the lines 6.2, 6.3, 7.1, 7.2 and 7.3 in FIG. 4 have been reduced in the regions which are labeled by way of the designation 15 and are shown in a shaded manner. Furthermore, movements of position and/or changes in the line course have been carried out at least in regions on the lines which are shown in FIG. 4. The lines 6.3 and 7.3 thus then have, for example, not only one line section but rather in each case two line sections which extend in the longitudinal direction and substantially parallel to the housing 2, the longitudinal axis of the respective rear line section which is positioned in the region of the combustion chamber 4 and the gas turbine 5 being arranged closer to the housing 2 than the longitudinal axis of the front line section of the same line which is positioned in the region of the compressor 3 and extends in the longitudinal direction and substantially parallel to the housing 2. Furthermore, in the case of some of the lines which are shown in FIG. 4, those positions have been changed, at which the lines are connected via housing flanges 15 to the housing 2. Moreover, the housing flanges 15 have been reduced at least partially in cross section. In addition, the axial compensators 14 have been replaced by new compensators 16 which also act laterally in part.

Figure 5:
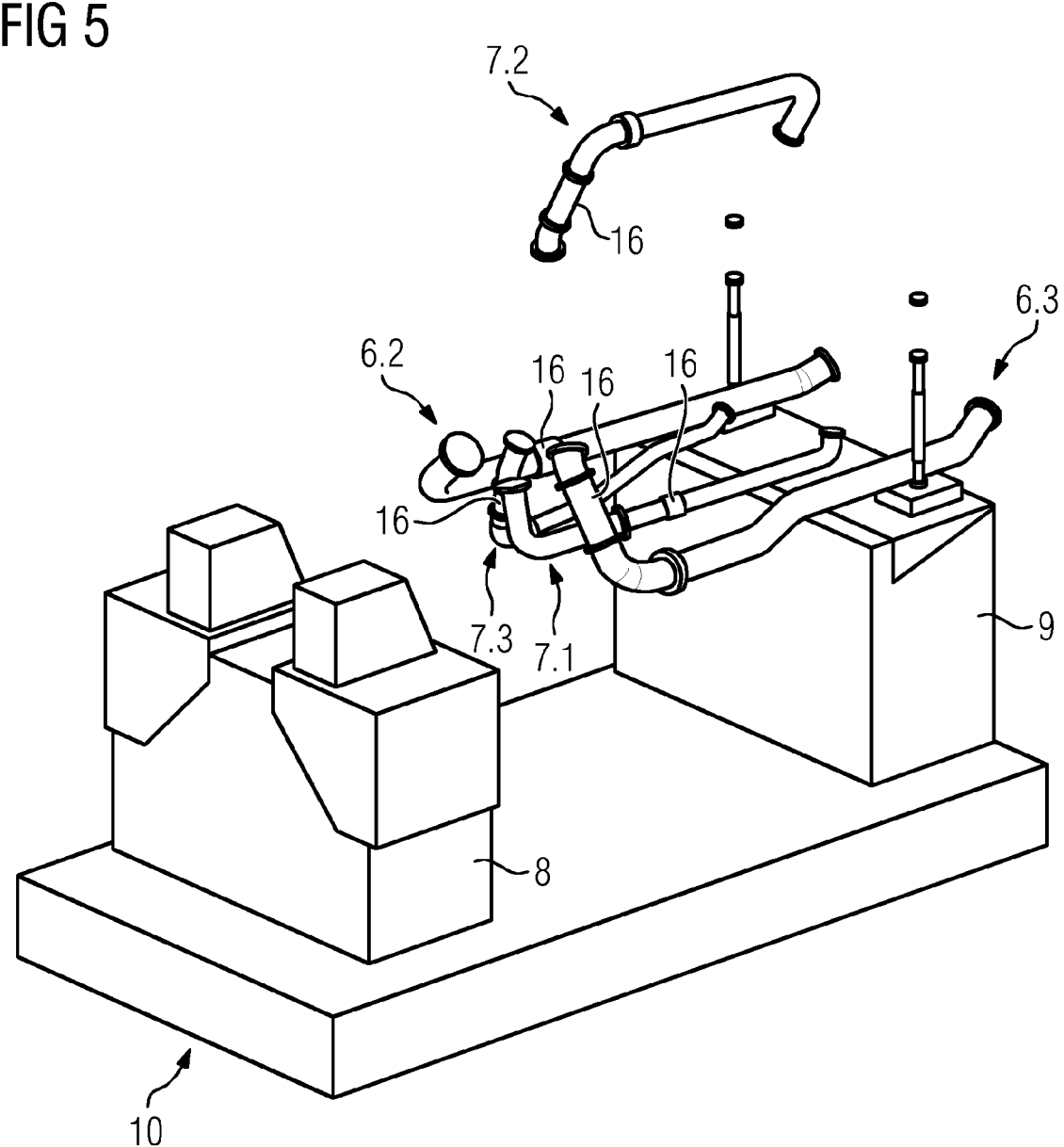
FIG. 5 shows a perspective view which shows the revised bleed air and removal lines in the installed state.

In a second method step, the gas turbine assembly is installed on the existing foundation 10. To this end, an adapter construction is used which has two adapter plates 18 and 19 which are placed onto the foundation blocks 8 and 9 and are fastened to the latter. The adapter construction serves to compensate for different positions and/or a different number of anchor points of the two designs of gas turbine assemblies. FIG. 5 shows that the lines 6.2 and 6.3 and 7.1, 7.2 and 7.3 then no longer collide with the foundation 10 or with the foundation block 9.

The method according to the invention is distinguished, in particular, by the fact that a gas turbine assembly of a first design can be replaced by a gas turbine assembly of a second design with retention of the foundation, although the latter has been designed only to receive the gas turbine assembly of the second design and is actually unsuitable for receiving one of the first design, since it does not make available the design or installation space which is required to receive it. Thanks to the method according to the invention, downtimes and costs which are associated with a replacement of the foundation can therefore be avoided.

Although the invention has been illustrated and described in greater detail by way of an exemplary embodiment, the invention is not restricted by way of the disclosed examples, and other variations can be derived therefrom by a person skilled in the art without departing from the scope of protection of the invention.

The invention claimed is:

1. A method for installing a gas turbine assembly of a first design at a position of an existing power plant, at which position a gas turbine assembly of a second design was previously installed on a foundation which is designed specifically for said second design, the gas turbine assembly of the first design comprising a housing, a compressor, a combustion chamber, a turbine and a plurality of bleed air and removal lines which are routed on the outside along the housing and which prevent the gas turbine assembly of the first design from being mounted on the foundation due to physical interference between the plurality of bleed air and removal lines and the foundation, the method comprising:
    in a first step, replacing an original line of the plurality of bleed air and removal lines of the gas turbine assembly of the first design with a changed line of a different design to create a changed gas turbine assembly and thereby make it possible to mount the changed gas turbine assembly on the foundation, and
    in a second step, installing the changed gas turbine assembly on the foundation.

2. The method as claimed in claim 1, wherein the first step is carried out at a different location than the second step.

3. The method as claimed in claim 1, wherein relative to the original line the changed line comprises at least one of:
    a movement of a connection position;
    a change in a shape;
    a reduction in a cross section;
    a reduction in an external diameter;
    a reduction in a thickness of at least one insulation means; and
    a different compensator.

4. The method as claimed in claim 1, further comprising at least one of: decreasing a size of a housing flange via which the changed line is attached to the housing; and changing a position of the housing flange via which the changed line is attached to the housing.

5. The gas turbine assembly as claimed in claim 1, wherein the physical interference is between the changed line and a foundation block of the foundation.

6. The gas turbine assembly as claimed in claim 1, wherein the gas turbine assembly of the second design comprises a second design housing, a second design compressor, a second design combustion chamber, and a second design turbine.

7. A gas turbine assembly, comprising:
    a housing which extends in a longitudinal direction, a compressor, a combustion chamber, and a turbine which are arranged behind one another in the longitudinal direction, and
    a plurality of bleed air and removal lines which are routed on the outside along the housing, which in each case comprise at least one line section which extends: in the longitudinal direction along a bottom half of the housing; above a foundation block of a foundation on which the gas turbine assembly is installed; and substantially parallel to the housing, and wherein the plurality of bleed air and removal lines are connected on an end side via housing flanges to the housing,
    wherein each section of the at least one line section comprises at least one of: a non-constant external diameter; an insulation means of non-constant thickness and/or a plurality of laterally offset line subsections which each extend in the longitudinal direction and substantially parallel to the housing.

8. The gas turbine assembly as claimed in claim 7, further comprising the foundation comprising the foundation block, wherein the gas turbine assembly is mounted to the foundation block, wherein the at least some of the plurality of bleed air and removal lines are disposed directly above the foundation block, and wherein each section is configured to avoid interference with the foundation block.

9. The gas turbine assembly as claimed in claim 8, wherein absent the non-constant external diameter, the insulation means of non-constant thickness, and/or the plurality of laterally offset line subsections, at least some of the plurality of bleed air and removal lines would interfere with the foundation block.

10. A method, comprising:
    removing an original line from an original gas turbine assembly that comprises a housing, a compressor, a combustion chamber, and the original line, wherein a physical interference between the original line and a select foundation would prevent installation of the original gas turbine assembly on the select foundation;
    creating a changed line of a different design than the original line; and
    installing the changed line in place of the original line to create a changed gas turbine assembly, wherein the different design of the changed line is configured to avoid the select foundation and thereby enable installation of the changed gas turbine assembly on the select foundation.

11. The method of claim 10, wherein relative to the original line the changed line comprises at least one of:
    a movement of a connection position and/or a change in a shape of a line section;
    a reduction in a cross section and/or a reduction in an external diameter;
    a reduction in a thickness of at least one insulation means; and
    a different compensator.

12. The method of claim 10,
    wherein in the original gas turbine assembly the original line connects to the housing at an original connection comprising a flange at a flange location;
    the method further comprising changing the original connection to a changed connection by changing at least one of a size of the flange and a location of the flange, wherein the changed connection is configured to connect the changed line to the housing of the changed gas turbine assembly.

* * * * *